United States Patent
Watanabe et al.

(10) Patent No.: US 10,227,429 B2
(45) Date of Patent: Mar. 12, 2019

(54) VINYLIDENE FLUORIDE COPOLYMER, METHOD FOR PRODUCING THE SAME, GEL ELECTROLYTE, AND NON-AQUEOUS BATTERY

(71) Applicant: Kureha Corporation, Tokyo (JP)

(72) Inventors: Keisuke Watanabe, Tokyo (JP); Shintarou Kamata, Tokyo (JP)

(73) Assignee: KUREHA CORPORATION, Tokyo (JP)

(*) Notice: Subject to any disclaimer, the term of this patent is extended or adjusted under 35 U.S.C. 154(b) by 185 days.

(21) Appl. No.: 15/124,686

(22) PCT Filed: Feb. 26, 2015

(86) PCT No.: PCT/JP2015/055608
§ 371 (c)(1),
(2) Date: Sep. 9, 2016

(87) PCT Pub. No.: WO2015/137137
PCT Pub. Date: Sep. 17, 2015

(65) Prior Publication Data
US 2017/0015772 A1    Jan. 19, 2017

(30) Foreign Application Priority Data
Mar. 11, 2014  (JP) .................... 2014-047513

(51) Int. Cl.
*C08F 214/22*    (2006.01)
*H01M 10/05*    (2010.01)
(Continued)

(52) U.S. Cl.
CPC ........ *C08F 214/225* (2013.01); *C08F 214/22* (2013.01); *C08F 214/222* (2013.01);
(Continued)

(58) Field of Classification Search
None
See application file for complete search history.

(56) References Cited

U.S. PATENT DOCUMENTS

| | | |
|---|---|---|
| 6,372,388 B1 | 4/2002 | Katsurao et al. |
| 6,824,927 B1 | 11/2004 | Katsurao et al. |

(Continued)

FOREIGN PATENT DOCUMENTS

| | | |
|---|---|---|
| CN | 103261247 A1 | 8/2013 |
| EP | 2868675 A1 | 5/2015 |

(Continued)

OTHER PUBLICATIONS

International Preliminary Report on Patentability for PCT/JP2015/055608 dated Sep. 13, 2016, 8 pages.

(Continued)

*Primary Examiner* — Scott J. Chmielecki
(74) *Attorney, Agent, or Firm* — Abel Law Group, LLP (57) ABSTRACT

The vinylidene fluoride copolymer of the present invention is a polymer obtained by copolymerizing at least one type of fluorine-based monomer selected from hexafluoropropylene and chlorotrifluoroethylene, vinylidene fluoride, and a compound represented by formula (1) (wherein X is an atomic group having a hydroxyl group or a carboxyl group and having a molecular weight of not greater than 517 with a main chain having from 1 to 19 atoms) and is obtained by adding the compound represented by formula (1) to the fluorine-based monomer and vinylidene fluoride in divided portions or continuously during copolymerization. The gel electrolyte of the present invention contains the vinylidene fluoride copolymer and a non-aqueous electrolyte solution, and the gel electrolyte has an excellent balance of ionic conductivity and gel strength.

(Continued)

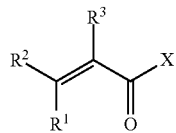

(1)

6 Claims, 2 Drawing Sheets (51) Int. Cl.
H01M 6/22 (2006.01)
H01M 10/0565 (2010.01)
H01M 10/0525 (2010.01)
C08F 220/28 (2006.01)

(52) U.S. Cl.
CPC ......... *H01M 6/22* (2013.01); *H01M 10/0525* (2013.01); *H01M 10/0565* (2013.01); *C08F 2220/283* (2013.01); *H01M 2300/0085* (2013.01)

(56) References Cited

U.S. PATENT DOCUMENTS

| 2002/0119377 | A1 | 8/2002 | Suzuki et al. | |
| 2002/0197536 | A1 | 12/2002 | Mori | |
| 2010/0133482 | A1 | 6/2010 | Abusleme et al. | |
| 2013/0230778 | A1* | 9/2013 | Saimen | H01M 10/056 429/303 |
| 2013/0264522 | A1 | 10/2013 | Stanga | |
| 2013/0273424 | A1* | 10/2013 | Watanabe | C09D 127/16 429/217 |
| 2014/0186718 | A1* | 7/2014 | Tsai | C08L 71/00 429/303 |
| 2015/0147462 | A1 | 5/2015 | Inaba et al. | |
| 2015/0299355 | A1* | 10/2015 | Sakai | B29C 47/02 428/36.9 |

FOREIGN PATENT DOCUMENTS

| JP | H11130821 A | 5/1999 |
| JP | 2002008723 A | 1/2002 |
| JP | 2003-059535 A | 2/2003 |
| JP | 2003040936 A | 2/2003 |
| JP | 2010525124 A | 7/2010 |
| JP | 2011048990 A | 3/2011 |
| JP | 2014-502650 A | 2/2014 |
| WO | 1999034372 A1 | 7/1999 |
| WO | 2012090876 A1 | 7/2012 |
| WO | 2014/002936 A1 | 1/2014 |
| WO | 2014002935 A1 | 1/2014 |
| WO | 2014002937 A1 | 5/2016 |

OTHER PUBLICATIONS

Extended European Search Report for corresponding European application EP15760888.6, dated Nov. 3, 2016, 6 pages.
office Action with regard to Chinese Application No. 201580010592.8, dated Apr. 24, 2017, 15 pgs (with English translation).
International Search Report of PCT/JP2015/055608 dated May 26, 2015.
Office Action dated Sep. 19, 2017 with regard to Japanese application No. JP 2014-047513 with translation, 13 pgs.

* cited by examiner

VINYLIDENE FLUORIDE COPOLYMER, METHOD FOR PRODUCING THE SAME, GEL ELECTROLYTE, AND NON-AQUEOUS BATTERY

TECHNICAL FIELD

The present invention relates to a vinylidene fluoride copolymer, a method for producing the same, a gel electrolyte containing the copolymer, and a non-aqueous battery having the gel electrolyte.

BACKGROUND ART

In recent years, batteries have been the focus of attention as power supplies for small portable devices such as smart phones, electric automobiles, and hybrid automobiles. Lithium ion batteries, which have a small volume and a large capacity, are presently a particular focus of attention among batteries.

Technical demands for batteries include reducing size and weight, increasing the degrees of freedom of the shape, and enhancing safety. As a means capable of meeting these demands, electrolyte solidification using an inorganic solid electrolyte, a polymer electrolyte, a gel electrolyte, or the like as the electrolyte constituting a battery is being researched. In electrolyte solidification, using a gel electrolyte is presently the most promising from the perspective of ionic conductivity.

Although gel electrolytes have relatively good ionic conductivity, there are demands for improvements. In order to achieve higher ionic conductivity in a gel electrolyte, it is necessary for the gel electrolyte to hold a larger amount of a non-aqueous electrolyte solution. However, when the gel electrolyte contains a large amount of a non-aqueous electrolyte solution, the gel strength decreases, so achieving both ionic conductivity and gel strength is a critical issue.

Under such circumstances, copolymers containing vinylidene fluoride (VDF) and hexafluoropropylene (HFP) or chlorotrifluoroethylene (CTFE) (for example, see Patent Document 1), vinylidene fluoride copolymers in which at least one type of a structure formed by esterifying some or all carboxyl groups or carboxylic acids and an acetic anhydride structure (for example, see Patent Document 2), copolymers containing vinylidene fluoride and unsaturated dibasic acid monoesters (for example, see Patent Documents 3 and 4), and the like have been proposed, but a gel electrolyte which sufficiently achieves both ionic conductivity and gel strength has not yet been obtained.

CITATION LIST

Patent Literature

Patent Document 1: WO/1999/034372
Patent Document 2: Japanese Unexamined Patent Application Publication No. 2002-8723A
Patent Document 3: Japanese Unexamined Patent Application Publication No. H11-130821A
Patent Document 4: Japanese Unexamined Patent Application Publication No. 2011-48990A

SUMMARY OF INVENTION

Technical Problem

The present invention was conceived in light of the problem described above, and the main object of the present invention is to provide a vinylidene fluoride copolymer which may be used in a gel electrolyte having an excellent balance between ionic conductivity and gel strength.

Solution to Problem

As a result of diligent research, the present inventors discovered that a gel electrolyte containing a vinylidene fluoride copolymer obtained by polymerization from specific monomers with a specific method can solve the above problem, and the present inventors thereby completed the present invention.

That is, the vinylidene fluoride copolymer of the present invention is a vinylidene fluoride copolymer obtained by copolymerizing at least one type of fluorine-based monomer selected from hexafluoropropylene and chlorotrifluoroethylene, vinylidene fluoride, and a compound represented by formula (1) below, the compound represented by formula (1) below being added to the fluorine-based monomer and vinylidene fluoride in divided portions or continuously during copolymerization.

The compound represented by formula (1) below is preferably a compound represented by formula (2) below, and the compound represented by formula (2) is preferably a compound represented by formula (3) below.

The gel electrolyte of the present invention contains the vinylidene fluoride copolymer described above and a non-aqueous electrolyte solution, and the gel electrolyte preferably contains from 90 to 99 wt. % of the non-aqueous electrolyte solution per 100 wt. % of the gel electrolyte.

The non-aqueous battery of the present invention has the gel electrolyte described above.

The production method for the vinylidene fluoride copolymer of the present invention is a production method for a vinylidene fluoride copolymer comprising copolymerizing at least one type of fluorine-based monomer selected from hexafluoropropylene and chlorotrifluoroethylene, vinylidene fluoride, and a compound represented by formula (1) below, the compound represented by formula (1) below being added to the fluorine-based monomer and vinylidene fluoride in divided portions or continuously during copolymerization.

[Chemical Formula 1]

(1)

(In formula (1), $R^1$, $R^2$, and $R^3$ are each independently a hydrogen atom, a chlorine atom, or an alkyl group having from 1 to 5 carbons; and X is a hydroxyl group or an atomic group having a carboxyl group and having a molecular weight of not greater than 517 with a main chain having from 1 to 19 atoms).

[Chemical Formula 2]

(2)

(In formula (2), $R^1$, $R^2$, and $R^3$ are the same as in formula (1); and X' is an atomic group having a molecular weight of not greater than 472 with a main chain having from 1 to 19 atoms).

[Chemical Formula 3]

(3)

(In formula (3), $R^1$, $R^2$, and $R^3$ are the same as in formula (1); and X" is an atomic group having a molecular weight of not greater than 456 with a main chain having from 1 to 18 atoms).

Advantageous Effects of Invention

By using the vinylidene fluoride copolymer of the present invention, it is possible to obtain a gel electrolyte having an excellent balance between ionic conductivity and gel strength.

DESCRIPTION OF EMBODIMENTS

[Vinylidene Fluoride Copolymer and Production Method Thereof]

The vinylidene fluoride copolymer and the production method for a vinylidene fluoride copolymer according to the present invention will be described in detail hereinafter.

[Vinylidene Fluoride Copolymer Structure]

The vinylidene fluoride copolymer of the present invention is a copolymer obtained by copolymerizing at least one type of fluorine-based monomer selected from hexafluoropropylene and chlorotrifluoroethylene, vinylidene fluoride, and a compound represented by formula (1) below. The vinylidene fluoride copolymer of the present invention may be obtained as a result of the compound represented by formula (1) below being added to the fluorine-based monomer and vinylidene fluoride in divided portions or continuously during copolymerization described above.

In the present specification, at least one type of fluorine-based monomer selected from hexafluoropropylene and chlorotrifluoroethylene is also referred to as a fluorine-based monomer (A).

[Chemical Formula 4]

(1)

(In formula (1), $R^1$, $R^2$, and $R^3$ are each independently a hydrogen atom, a chlorine atom, or an alkyl group having from 1 to 5 carbons; and X is a hydroxyl group or an atomic group having or a carboxyl group and having a molecular weight of not greater than 517 with a main chain having from 1 to 19 atoms).

The vinylidene fluoride copolymer of the present invention is a polymer having a constituent unit derived from the fluorine-based monomer (A), a constituent unit derived from vinylidene fluoride, and a constituent unit derived from a compound represented by formula (1), but the vinylidene fluoride copolymer may also have constituent units derived from other monomers.

The crystallinity of the vinylidene fluoride copolymer of the present invention is controlled as a result of containing the fluorine-based monomer (A), which imparts non-aqueous electrolyte solution retention to the vinylidene fluoride copolymer. In addition, the uniformity of the distribution of carboxyl groups in the polymer is presumed to be high since the compound represented by formula (1) is added in divided portions or continuously during polymerization. This means that the crosslinking point due to hydrogen bonds of carboxyl groups in the gel electrolyte is distributed uniformly, and it is presumed that the gel strength is enhanced as a result. In this way, the gel electrolyte of the present invention can hold a large amount of a non-aqueous electrolyte solution while maintaining gel strength, which yields an excellent balance between ionic conductivity and gel strength.

(Monomers)

As described above, the vinylidene fluoride polymer of the present invention is a polymer obtained by copolymerizing the fluorine-based monomer (A), vinylidene fluoride, and a compound represented by formula (1), and the vinylidene fluoride polymer has constituent units derived from these monomers.

The fluorine-based monomer (A) is at least one type selected from hexafluoropropylene and chlorotrifluoroethylene. That is, the fluorine-based monomer (A) may be hexafluoropropylene alone, chlorotrifluoroethylene alone, or hexafluoropropylene and chlorotrifluoroethylene.

The compound represented by formula (1) is preferably a compound represented by formula (2) and is more preferably a compound represented by formula (3) below.

When a compound represented by formula (2) is used, carboxyl groups derived from the compound represented by formula (2) contained in the vinylidene fluoride copolymer are present at a position apart from the vinylidene fluoride polymer main chain via a spacer, so the degrees of freedom of the arrangement of the carboxyl groups increases. When a copolymer having such a feature is used in a gel electrolyte, a crosslinked structure resulting from hydrogen bonds of carboxyl groups is formed effectively due to the high degrees of freedom of the arrangement of the carboxyl groups, which is preferable in that the gel strength is further enhanced.

[Chemical Formula 5]

(2)

(In formula (2), $R^1$, $R^2$, and $R^3$ are the same as in formula (1); and X' is an atomic group having a molecular weight of not greater than 472 with a main chain having from 1 to 19 atoms).

[Chemical Formula 6]

(3)

(In formula (3), $R^1$, $R^2$, and $R^3$ are the same as in formula (1); and X'' is an atomic group having a molecular weight of not greater than 456 with a main chain having from 1 to 18 atoms). In formulas (1) to (3), $R^1$, $R^2$, and $R^3$ are each independently a hydrogen atom, a chlorine atom, or an alkyl group having from 1 to 5 carbons, but $R^1$ and $R^2$ are particularly preferably substituents with little steric hindrance from the perspective of polymerization reactivity. For example, each moiety is preferably hydrogen or an alkyl group having from 1 to 3 carbons and more preferably hydrogen or a methyl group.

In formula (1), if X is an atomic group, X has a carboxyl group, and the molecular weight of X is not greater than 517 but is preferably not greater than 217. The lower limit of the molecular weight of X is not particularly limited, but X has the form —$CH_2$—COOH (molecular weight: 59). In formula (2), the molecular weight of X' is not greater than 472 but is preferably not greater than 172. The lower limit of the molecular weight of X' is not particularly limited, but X' has the form —$CH_2$— (molecular weight: 14). In formula (3), the molecular weight of X'' is not greater than 456 but is preferably not greater than 156. The lower limit of the molecular weight of X'' is not particularly limited, but X'' normally has the form —$CH_2$— (molecular weight: 14).

The molecular weight of X, X', or X'' is preferably within the ranges described above from the perspective of polymerizability.

In formula (1), if X is an atomic group, the main chain of X comprises from 1 to 19 atoms. The number of atoms of the main chain is preferably from 1 to 14 and more preferably from 1 to 9.

In formula (2), the main chain of X' comprises from 1 to 19 atoms. The number of atoms of the main chain is preferably from 1 to 14 and more preferably from 1 to 9.

In formula (3) above, the main chain of X'' comprises from 1 to 18 atoms. The main chain preferably comprises from 1 to 13 atoms and more preferably comprises from 1 to 8 atoms.

The number of atoms of the main chain is preferably within the ranges described above from the perspective of polymerizability.

Note that the number of atoms of the main chain in formulas (1), (2), and (3) refers to the number of atoms of the skeleton portion of a chain, which connects the carboxyl group of X or the carboxyl group denoted on the right side of X' or X'' and the group denoted on the left side ($R^1R^2C=CR^3$—CO—, [formula (1)]), ($R^1R^2C=CR^3$—CO—, [formula (2)]), ($R^1R^2=CR^3$—COO—, [formula (3)]) with the fewest atoms.

For example, the numbers of atoms of the main chains of 2-carboxyethyl acrylate (CEA), acryloyloxy ethyl succinate (2-acryloyloxy ethyl succinate) (AES), and acryloyloxyethyl phthalic acid (formula (B) below) are as follows.

If the compounds represented by formulas (1) to (3) are CEA, X is —$OCH_2CH_2$—COOH in formula (1), so the skeleton portion of the main chain is —OCC—, and the number of atoms is 3. Similarly, in formula (2), the number of atoms of the main chain of X' is 3, and in formula (3), the number of atoms of the main chain of X'' is 2.

When the compounds represented by formulas (1) to (3) are AES, X is —$OCH_2CH_2O$—(CO)—$CH_2CH_2$—COOH in formula (1), so the skeleton portion of the main chain is —OCCO—C—CC—, and the number of atoms is 7. Similarly, in formula (2), the number of atoms of the main chain of X is 7, and in formula (3), the number of atoms of the main chain of X'' is 6.

If the compounds represented by formulas (1) to (3) are acryloyloxyethyl phthalic acid, the structure in which the carboxyl group is removed from X in formula (1) is represented by formula (B') below, so the number of atoms of the main chain of X is 7. Similarly, in formula (2), the number of atoms of the main chain of X is 7, and in formula (3), the number of atoms of the main chain of X'' is 6.

[Chemical Formula 7]

In addition, even in the case of a compound having a plurality of carboxyl groups, the number of atoms of the main chain is the smallest value for the number of atoms of the skeleton portion. For example, if the compound represented by formula (1) is the compound represented by formula (C) below, the number of atoms of the skeleton portion of the chain connecting a acryloyl group and a carboxyl group may be 5 or 7, but the number of atoms of the main chain is 5, which is the smaller number of atoms of the skeleton portion.

[Chemical Formula 8]

(C)

The compound represented by formula (1) is preferably a compound represented by formula (2), but examples of other compounds include acrylic acids and methacrylic acids.

The compound represented by formula (2) is preferably a compound represented by formula (3), but examples of other compounds include (meth)acrylamide-based compounds and thio(meth)acrylate compounds. Specific examples thereof include N-carboxyethyl(meth)acrylamide and carboxyethylthio(meth)acrylate.

Note that in the present invention, (meth)acrylic and (meth)acrylate signify acrylic and/or methacrylic and acrylate and/or methacrylate, respectively.

Examples of the compound represented by formula (3) include 2-carboxyethyl acrylate, 2-carboxyethyl methacrylate, acryloyloxyethyl succinate, methacryloyloxyethyl succinate, acryloyloxypropyl succinate, methacryloyloxypropyl succinate, acryloyloxyethyl phthalate, methacryloyloxyethyl phthalate, acryloyloxypropyl phthalate, and methacryloyloxypropyl phthalate, among which 2-carboxyethyl acrylate, 2-carboxyethyl methacrylate, acryloyloxyethyl succinate, methacryloyloxyethyl succinate, acryloyloxypropyl succinate, and methacryloyloxypropyl succinate are preferable due to their excellent copolymerizability with vinylidene fluoride.

When the total of the constituent unit derived from the fluorine-based monomer (A), the constituent unit derived from vinylidene fluoride, and the constituent unit derived from a compound represented by formula (1) is defined as 100 mol %, the vinylidene fluoride copolymer of the present invention preferably has from 0.01 to 10 mol %, more preferably from 0.05 to 7.5 mol %, and particularly preferably from 0.1 to 5 mol % of a constituent unit derived from the fluorine-based monomer (A), preferably has from 80 to 99.98 mol %, more preferably from 85 to 99.9 mol %, and particularly preferably from 90 to 99 mol % of the constituent unit derived from vinylidene fluoride, and preferably has from 0.01 to 10 mol %, more preferably from 0.05 to 7.5 mol %, and particularly preferably from 0.1 to 5 mol % of the constituent unit derived from a compound represented by formula (1).

The amount of the constituent unit derived from the fluorine-based monomer (A), the amount of the constituent unit derived from vinylidene fluoride, and the amount of the constituent unit derived from a compound represented by formula (1) in the vinylidene fluoride copolymer of the present invention can ordinarily be determined by using a plurality of methods including the $^1$H-NMR spectrum, neutralization titration, the IR spectrum, and the $^{19}$F-NMR spectrum of the vinylidene fluoride copolymer. For example, the ratio of the amount of the constituent unit derived from a compound represented by formula (1) and the amount of the constituent unit derived from vinylidene fluoride or the ratio of the amount of the constituent unit derived from a compound represented by formula (1) and the amount of constituent units derived from other monomers may be determined by the $^1$H-NMR spectrum, neutralization titration, the IR spectrum, or the like, and the ratio of the amount of the constituent unit derived from the fluorine-based monomer (A) and the amount of the constituent unit derived from vinylidene fluoride may be determined by the $^{19}$F-NMR spectrum. The amount of the constituent unit derived from the fluorine-based monomer (A), the amount of the constituent unit derived from vinylidene fluoride, and the amount of the constituent unit derived from a compound represented by formula (1) in the vinylidene fluoride copolymer can be determined from these ratios.

Note that the $^1$H-NMR spectrum may be used advantageously in the case where the constituent unit derived from a compound represented by formula (1) has a signal that does not overlap with the signals of constituent units derived from other monomers. In addition, neutralization titration may be used advantageously in the case where groups other than the carboxyl group of the constituent unit derived from a compound represented by formula (1) do not react with bases. The IR spectrum may be used advantageously in the case where a $^1$H-NMR spectrum or neutralization titration cannot be performed.

Examples of other monomers other than the fluorine-based monomer (A), vinylidene fluoride, and a compound represented by formula (1) include fluorine-based monomers (B) or hydrocarbon-based monomers such as ethylene and propylene that are copolymerizable with vinylidene fluoride, and monomers that are copolymerizable with the compound of formula (1). Examples of fluorine-based monomers (B) that are copolymerizable with vinylidene fluoride include vinyl fluoride, trifluoroethylene, tetrafluoroethylene, and perfluoroalkyl vinyl ethers such as perfluoromethyl vinyl ethers. Examples of monomers that are copolymerizable with the compound of formula (1) include alkyl (meth)acrylate compounds such as methyl(meth)acrylate. Furthermore, one type of these other monomers may be used alone, or two or more types may be used.

If the vinylidene fluoride copolymer of the present invention has a constituent unit derived from the above other monomers, it preferably has from 0.01 to 10 mol % of that constituent unit derived from the above other monomers, based on 100% total of the constituent units derived from all monomers that constitute the copolymer.

(Production Method for Vinylidene Fluoride Copolymer)

The production method for the vinylidene fluoride copolymer of the present invention is a production method for a vinylidene fluoride copolymer comprising copolymerizing a fluorine-based monomer (A), vinylidene fluoride, and a compound represented by formula (1), wherein the compound represented by formula (1) is being added to the fluorine-based monomer (A) and vinylidene fluoride in divided portions or continuously during copolymerization. In the case where the other monomers described above are used as raw materials, the other monomers may be added to the reaction system at the beginning of the reaction or may be added to the reaction system at an intermediate point during the reaction.

The gel electrolyte of the present invention containing a vinylidene fluoride copolymer obtained by adding the compound represented by formula (1) in divided portions or continuously during copolymerization has an excellent balance between ionic conductivity and gel strength.

When performing copolymerization in the present invention, the compound represented by formula (1) is added in divided portions or continuously to the fluorine-based monomer (A) and vinylidene fluoride. Specifically, the compound represented by formula (1) may be added in divided portions or continuously to the entire amount of the fluorine-based monomer (A) and the entire amount of the vinylidene fluoride used in copolymerization, or the portion of the compound represented by formula (1) may be added in divided portions or continuously to the entire amount of the fluorine-based monomer (A), the entire amount of the vinylidene fluoride, and the remaining portion of the compound represented by formula (1) used in copolymerization. In addition, a portion of the fluorine-based monomer (A) and a portion of the vinylidene fluoride may also be added later during the reaction.

Further, when the compound represented by formula (1) is added in divided portions, the method of adding the compound in divided portions is not particularly limited, but taking into consideration the polymerization rate of each monomer, a method may be selected appropriately within a range so that the copolymer of present invention is substantially different from the copolymer obtained by adding the compound represented by formula (1) to reaction system at once. Ordinarily, the compound represented by formula (1) is added in divided portions of 2 or more, preferably added in 2 to 20 divided portions, and more preferably added in 2 to 10 divided portions. The added amount of each divided portion may be an amount determined by dividing the total amount evenly or unevenly by the number of divisions, and the intervals between each of the additions may be even or uneven.

When the compound is added continuously, the compound is ordinarily added over the course of not less than 1 hour, preferably from 1 to 100 hours, and more preferably from 2 to 50 hours in order to add the entire amount of the compound represented by formula (1).

In addition, if a portion of the compound represented by formula (1) is added in advance and the remaining compound represented by formula (1) is added in divided portions or continuously, the added amount of the compound represented by formula (1) in advance is ordinarily from 1 to 50 wt. % and preferably from 3 to 30 wt. % per 100 wt. % of the compound represented by formula (1) used in copolymerization.

In copolymerization, the compound represented by formula (1) is added in divided portions or continuously to the fluorine-based monomer (A) and vinylidene fluoride, but the compound is preferably added continuously because the uniformity of the distribution of carboxyl groups in the polymer is presumed to be higher.

For the addition of the compound represented by formula (1) performed in divided portions or continuously, the start and the end for the addition are not particularly limited as long as these timings are before the completion of the polymerization of the fluorine-based monomer (A) and vinylidene fluoride.

The vinylidene fluoride copolymer of the present invention obtained by adding the compound represented by formula (1) in divided portions or continuously has a higher uniformity of carboxyl group distribution in the polymer than a vinylidene fluoride copolymer obtained by adding the compound represented by formula (1) to the reaction system at once, so a gel electrolyte having an excellent balance between ionic conductivity and gel strength can be obtained by using the vinylidene fluoride copolymer.

The method of producing the vinylidene fluoride copolymer of the present invention is not particularly limited with the exception that the compound represented by formula (1) is added in divided portions or continuously, but the vinylidene fluoride copolymer is ordinarily produced by suspension polymerization, emulsion polymerization, solution polymerization, or the like. From the viewpoint of ease of post-treatment, suspension polymerization in an aqueous system and emulsion polymerization are preferred, and suspension polymerization in an aqueous system is particularly preferred.

In suspension polymerization using water as the dispersion medium, a suspending agent such as methylcellulose, methoxy methylcellulose, propoxy methylcellulose, hydroxy ethylcellulose, hydroxy propylcellulose, poly(vinyl alcohol), poly(ethylene oxide), gelatin or the like is added in the range of 0.005 to 1.0 parts by mass, and preferably of 0.01 to 0.4 parts by mass, per 100 parts by mass of the total monomer used in copolymerization (fluorine-based monomer (A), vinylidene fluoride, the compound represented by formula (1), and other monomers used as necessary).

Examples of polymerization initiators that can be used include di-i-propyl peroxy dicarbonate, di-n-propyl peroxy dicarbonate, di-n-heptafluoropropyl peroxy dicarbonate, i-butyryl peroxide, di(chlorofluoroacyl)peroxide, di(perfluoroacyl)peroxide, and t-butyl peroxy pivalate. The used amount thereof is from 0.05 to 5 parts by mass and preferably from 0.15 to 2 parts by mass based on 100% total of monomers used in copolymerization (fluorine-based monomer (A), vinylidene fluoride, the compound represented by formula (1), and other monomers used as necessary).

Additionally, a chain transfer agent such as ethyl acetate, methyl acetate, diethyl carbonate, acetone, ethanol, n-propanol, acetaldehyde, propylaldehyde, ethyl propionate or carbon tetrachloride may be added to adjust the degree of polymerization of the obtained vinylidene fluoride copolymer. If a chain transfer agent is used, the used amount thereof is from 0.1 to 5 parts by mass and preferably from 0.5 to 3 parts by mass based on 100% total of monomers used in copolymerization (fluorine-based monomer (A), vinylidene fluoride, the compound represented by formula (1), and other monomers used as necessary).

The charged amount of all monomers used in copolymerization (fluorine-based monomer (A), vinylidene fluoride, the compound represented by formula (1), and other monomers used as necessary) is ordinarily from 1:1 to 1:10 and preferably from 1:2 to 1:5 in terms of the ratio of the total amount of monomers to the mass of water. The ratio of the charged amounts of the fluorine-based monomer (A), vinylidene fluoride, the compound represented by formula (1), and other monomers used as necessary may be adjusted appropriately so that the amount of the constituent unit derived from each monomer of the obtained vinylidene fluoride copolymer is within the range described above.

The polymerization temperature T is selected as appropriate according to the 10-hour half-life temperature $T_{10}$ of the polymerization initiator, and is normally selected in the range of $T_{10}-25°$ C.$\leq T \leq T_{10}+25°$ C. For example, $T_{10}$ of t-butyl peroxy pivalate and di-i-propyl peroxy dicarbonate are 54.6° C. and 40.5° C., respectively (refer to product catalog of NOF Corporation). Therefore, in polymerization using t-butyl peroxy pivalate and di-i-propyl peroxy dicarbonate as a polymerization initiator, the polymerization temperature T is selected as appropriate in the range of 29.6° C.$\leq T \leq 79.6°$ C. and 15.5° C.$\leq T \leq 65.5°$ C., respectively. The polymerization time is not limited, but not greater than 100 hours is preferred in view of the productivity. The pressure during polymerization is normally higher than normal pressure, and is preferably from 2.0 to 8.0 MPa-G.

By performing suspension polymerization in an aqueous system under the above conditions, the fluorine-based monomer (A), vinylidene fluoride, the compound represented by formula (1), and other monomers used as necessary can be easily copolymerized, and the vinylidene fluoride copolymer of the present invention can be obtained.

(Physical Properties of Vinylidene Fluoride Copolymer)

The inherent viscosity (logarithmic viscosity at 30° C. of a solution obtained by dissolving 4 g of resin in 1 liter of N,N-dimethylformamide; similarly hereinafter) of the vinylidene fluoride copolymer of the present invention is preferably a value in the range of from 1.0 to 10.0 dl/g and more preferably a value in the range of from 1.5 to 7.0 dl/g. When the viscosity is within the range described above, the vinylidene fluoride copolymer can be suitably used in a gel electrolyte.

The inherent viscosity $\eta_i$ may be calculated by dissolving 80 mg of the vinylidene fluoride copolymer in 20 mL of N,N-dimethylformamide, and using an Ubbelohde viscometer in a 30° C. thermostatic bath, with the following formula.

$$\eta_i = (1/C) \cdot \ln(\eta/\eta_0)$$

Here, $\eta$ is the viscosity of the polymer solution, $\eta_0$ is the viscosity of N,N-dimethylformamide (solvent) alone, and C is 0.4 g/dl.

[Gel Electrolyte]

The gel electrolyte of the present invention will be described in detail hereinafter.

The gel electrolyte of the present invention contains the vinylidene fluoride copolymer described above and a non-aqueous electrolyte solution.

The non-aqueous electrolyte solution used in the gel electrolyte of the present invention is not particularly limited. A non-aqueous electrolyte solution used to obtain a gel electrolyte may be used.

A solution obtained by dissolving an electrolyte such as a lithium salt in a non-aqueous solvent (organic solvent) may ordinarily be used as a non-aqueous electrolyte solution.

The electrolyte concentration of the non-aqueous electrolyte solution that is used is ordinarily from 0.1 to 3 mol/dm$^3$ and preferably from 0.5 to 2 mol/dm$^3$.

Examples of electrolytes include $LiPF_6$, $LiAsF_6$, $LiClO_4$, $LiBF_4$, LiCl, LiBr, $LiCH_3SO_3$, $LiCF_3SO_3$, $LiN(CF_3SO_2)_2$, and $LiC(CF_3SO_2)_3$. One type of these electrolytes may be used, or two or more types may be used.

Examples of non-aqueous solvents (organic solvents) include propylene carbonate, ethylene carbonate, 1,2-dimethoxyethane, 1,2-diethoxyethane, dimethyl carbonate, diethyl carbonate, ethyl methyl carbonate, γ-butyrolactone, methyl propionate, and ethyl propionate. One type of these non-aqueous solvents may be used, or two or more types may be used.

The ionic conductivity and the gel strength of a gel electrolyte typically have a trade-off relationship. This is because although the ionic conductivity increases as the amount of the non-aqueous electrolyte solution constituting the gel electrolyte increases, as the amount of the non-aqueous electrolyte solution increases, the amount of the polymer inevitably decreases, and the gel strength is thus diminished.

On the other hand, by using the vinylidene fluoride copolymer described above, the gel electrolyte of the present invention achieves a better balance between ionic conductivity and gel strength than in conventional gel electrolytes. In other words, when the gel electrolyte of the present invention exhibits the same level of ionic conductivity as a conventional gel electrolyte, the gel electrolyte of the present invention has better gel strength than the conventional gel electrolyte, and when the gel electrolyte of the present invention exhibits the equivalent level of gel strength as a conventional gel electrolyte, the gel electrolyte of the present invention has better ionic conductivity than the conventional gel electrolyte.

The reason that the gel electrolyte of the present invention has the effect described above is that by using the vinylidene fluoride copolymer described above, the gel strength can be maintained even if the gel electrolyte of the present invention contains a larger amount of non-aqueous electrolyte solution than a conventional gel electrolyte.

The gel electrolyte of the present invention contains the non-aqueous electrolyte solution in an amount of ordinarily from 70 to 99.9 wt. %, preferably from 90 to 99 wt. %, and more preferably from 91 to 97 wt. % per 100 wt. % of the gel electrolyte. In addition, the gel electrolyte contains the vinylidene fluoride copolymer described above in an amount of ordinarily from 0.1 to 30 wt. %, preferably from 1 to 10 wt. %, and more preferably from 3 to 9 wt. %.

The gel electrolyte of the present invention ordinarily has a sheet shape. When the gel electrolyte of the present invention has a sheet shape, the thickness thereof is ordinarily from 0.1 to 1000 μm and preferably from approximately 0.5 to approximately 200 μm.

The gel electrolyte of the present invention is formed as follows, for example, from the vinylidene fluoride copolymer described above and a non-aqueous electrolyte solution. An example of a method for obtaining the gel electrolyte is a method of obtaining a film-like gel electrolyte via a process of mixing a vinylidene fluoride copolymer, a non-aqueous electrolyte solution, and a volatile organic solvent and then volatilizing the volatile organic solvent from the obtained mixture. Another method is to mix a vinylidene fluoride copolymer and a volatile organic solvent so as to prepare a solution in which the vinylidene fluoride copolymer is dissolved. Next, the solution and the non-aqueous electrolyte solution are mixed. Next, a film-like gel electrolyte is obtained via a process of volatilizing the volatile organic solvent from the obtained mixture. The mixing of these components is ordinarily performed under heating conditions and preferably at 40 to 150° C. In addition, the process of volatilizing the volatile organic solvent is ordinarily performed at 0 to 100° C. and preferably at 10 to 25° C.

The volatile organic solvent is preferably a solvent which has a high vapor pressure at a relatively low temperature, is easy to volatilize, and readily dissolves the vinylidene fluoride copolymer. Examples of volatile organic solvents that may be used include tetrahydrofuran, methyl tetrahydrofuran, acetone, ethyl methyl ketone, 1,3-dioxolane, cyclohexanone and dimethyl carbonate, but the organic solvent is not necessarily limited to these examples.

Of the non-aqueous solvents (organic solvents) described above, propylene carbonate, ethylene carbonate, dimethyl carbonate, or the like may itself be used as a solvent of the vinylidene fluoride copolymer, so in the case where these solvents are used as non-aqueous solvents (organic solvents), a polymer electrolyte can also be formed without using a volatile organic solvent. In this case, the electrolyte may be added to and further dissolved in a solution prepared by dissolving the vinylidene fluoride copolymer with an organic solvent, or the vinylidene fluoride copolymer and the electrolyte may be dissolved simultaneously with an organic solvent. Alternatively, the non-aqueous electrolyte solution and the vinylidene fluoride copolymer may be mixed and then the vinylidene fluoride copolymer is dissolved in the mixture. These processes are ordinarily performed under heating conditions and preferably at 40 to 150° C., and a film-like gel electrolyte can be obtained by cooling the solution prepared by dissolving the vinylidene fluoride copolymer and the electrolyte to room temperature.

Furthermore, a gel electrolyte may also be obtained by molding a vinylidene fluoride copolymer into a film shape and then swelling the film with a non-aqueous electrolyte solution.

In the working examples and comparative examples described below, propylene carbonate was used as a non-aqueous solvent, and dimethyl carbonate was used as a volatile organic solvent.

[Non-Aqueous Battery]

The non-aqueous battery of the present invention will be described in detail hereinafter.

The non-aqueous battery of the present invention has the gel electrolyte described above. The non-aqueous battery of the present invention is ordinarily a non-aqueous secondary battery such as a lithium-ion secondary battery.

The non-aqueous battery of the present invention is not particularly limited with the exception of having the aforementioned gel electrolyte as an electrolyte.

As members other than the gel electrolyte described above, the non-aqueous battery has a cathode ordinarily formed from a current collector and a cathode mixture layer and an anode ordinarily formed from a current collector and an anode mixture, and the gel electrolyte is positioned between the cathode and the anode. The gel electrolyte may comprise a substance in which the cathode and anode are prepared separately and laminated, or may be prepared directly on the cathode and/or the anode.

The cathode, anode, and other members of the non-aqueous battery are not particularly limited, and components used in non-aqueous batteries may be used appropriately.

EXAMPLES

Working examples of the present invention are described in greater detail below, but the present invention is not limited thereby.

In the working examples and comparative examples described below, the $^1$H-NMR spectrum and the $^{19}$F-NMR spectrum of the polymer powder (vinylidene fluoride copolymer) were measured under the following conditions.

[$^1$H-NMR Spectrum]
Instrument: AVANCE AC 400FT NMR spectrometer manufactured by Bruker Corp.
Measurement Conditions
Frequency: 400 MHz
Measurement solvent: DMSO-$d_6$
Measurement temperature: 25° C.

[$^{19}$F-NMR Spectrum]
Instrument: AVANCE AC 400FT NMR spectrometer manufactured by Bruker Corp.
Measurement Conditions
Frequency: 376 MHz
Measurement solvent: DMSO-$d_6$
Measurement temperature: 25° C.

Working Example 1

(Production of Vinylidene Fluoride Copolymer (1))

First, 7,800 g of ion-exchanged water, 4.2 g of Metolose SM-100 (manufactured by Shin-Etsu Chemical Co., Ltd.), 3.3 g of acryloyloxyethyl succinate (AES), 25.5 g of a 50 wt. % di-i-propyl peroxy dicarbonate (IPP)-Freon 225 cb solution, 2,700 g of vinylidene fluoride (VDF), and 300 g of hexafluoropropylene (HFP) were charged into an autoclave with an internal volume of 10 liters and were heated to 29° C.

A 50 wt. % acryloyloxyethyl succinate-methanol solution was then gradually added at a rate of 0.1 g/min while the temperature was maintained at 29° C. A total of 32.1 g of acryloyloxyethyl succinate was added, including the amount added initially. Polymerization was performed for a total of 23 hours from the start of heating.

After polymerization was ended, the polymer slurry was heat-treated for 60 minutes at 95° C. The polymer slurry was then dehydrated, washed with water, and dried again for 20 hours at 80° C. to obtain a polymer powder (vinylidene fluoride copolymer (1)).

The polymerization conversion was 84%, and the inherent viscosity of the obtained polymer was 2.12 dl/g.

When the amount of each monomer unit in the obtained vinylidene fluoride copolymer (1) was calculated from various NMR spectra, the results were as follows. VDF: 96.73 mol %; HFP: 2.95 mol %; and AES: 0.32 mol %.

The amount of each monomer unit in the vinylidene fluoride copolymer (1) was calculated so that the total amount of VDF, HFP, and AES was 100 mol % after the VDF/HFP ratio and the VDF/AES ratio were calculated using the methods described below.

The VDF/HFP ratio in the vinylidene fluoride copolymer (1) (the molar ratio of the amount of the constituent unit derived from vinylidene fluoride and the amount of the constituent unit derived from HFP) was calculated on the basis of the integrated signal intensities in the vicinity of δ-70 to −75 originating from $CF_3$ in HFP and signals in the vicinity of 6-90 to -94 originating from $CF_2$ in the $^{19}$F-NMR spectrum.

The VDF/AES ratio in the vinylidene fluoride copolymer (1) (the molar ratio of the amount of the constituent unit derived from vinylidene fluoride and the amount of the constituent unit derived from acryloyloxyethyl succinate) was calculated on the basis of the integrated signal intensities observed at 4.18 ppm originating primarily from acryloyloxyethyl succinate and the signals observed at 2.24 ppm and 2.87 ppm originating primarily from vinylidene fluoride in the $^1$H-NMR spectrum.

The production conditions, physical properties, and composition of the vinylidene fluoride copolymer (1) are shown in Table 1.

(Gel Electrolyte Production and Evaluation)

The vinylidene fluoride copolymer (1) described above, a 1 mol/dm$^3$ LiClO$_4$-propylene carbonate solution (non-aqueous electrolyte solution), and dimethyl carbonate (DMC) were mixed in the prescribed amounts shown in Table 2 and dissolved while heating at 60 to 90° C.

The solution was then fed into an aluminum foil Petri dish, and the DMC was volatilized at room temperature and atmospheric pressure to produce a gel electrolyte. The gel electrolyte was then cut to 10 mm (thickness) by 10 mm (φ) to prepare a test piece.

The compressive elasticity modulus of the obtained test piece was analyzed with reference to JIS K-7181.

The obtained test piece was subjected to a compression test at a head speed of 1 mm/min using a compression tester ("STA-1150 UNIVERSAL TESTING MACHINE" manufactured by ORIENTEC), and the compressive elasticity modulus was calculated from the initial slope of the obtained S-S curve.

The ionic conductivity of the obtained test piece was determined using the following method.

An AC impedance measurement was performed on the obtained test piece within the frequency range of from 1 MHz to 0.01 Hz using an impedance analyzer (SI-1260 manufactured by Solatron), and the ionic conductivity was calculated on the basis of the results thereof.

The evaluation results of the gel electrolyte are shown in Table 2.

Comparative Example 1

(Production of Vinylidene Fluoride Copolymer (c1))

The ingredients were polymerized with the same method as in Working Example 1 with the exception that the entire amount of acryloyloxyethyl succinate shown in Table 2 was added initially rather than being added in divided portions or continuously during polymerization. The polymer yield was 86%, and the inherent viscosity of the obtained polymer (vinylidene fluoride copolymer (c1)) was 2.34 dl/g.

When the amount of each monomer unit in the obtained vinylidene fluoride copolymer (c1) was calculated from various NMR spectra, the results were as follows. VDF: 97.06 mol %; HFP: 2.70 mol %; and AES: 0.24 mol %.

The amount of each monomer unit in the vinylidene fluoride copolymer (c1) was calculated so that the total amount of VDF, HFP, and AES was 100 mol % after the VDF/HFP ratio and the VDF/AES ratio were calculated using the same methods as in Working Example 1.

The production conditions, physical properties, and composition of the vinylidene fluoride copolymer (c1) are shown in Table 1.

(Gel Electrolyte Production and Evaluation)

A gel electrolyte was obtained and evaluated in the same manner as in Working Example 1 with the exception that the vinylidene fluoride copolymer (1) was replaced with the vinylidene fluoride copolymer (c1).

The evaluation results of the gel electrolyte are shown in Table 2.

Comparative Example 2

(Production of Vinylidene Fluoride Copolymer (c2))

First, 7,770 g of ion-exchanged water, 4.5 g of Metolose SM-100 (manufactured by Shin-Etsu Chemical Co., Ltd.), 15 g of monomethyl maleate (MMM), 25.2 g of a 50 wt. % di-i-propyl peroxy dicarbonate (IPP)-Freon 225 cb solution, 2,700 g of vinylidene fluoride, and 300 g of hexafluoropropylene (HFP) were charged into an autoclave with an internal volume of 10 liters and were heated to 29° C.

Polymerization was then performed for a total of 33 hours from the start of heating while the temperature was maintained at 29° C.

After polymerization was ended, the polymer slurry was heat-treated for 60 minutes at 95° C. The polymer slurry was then dehydrated, washed with water, and dried again for 20 hours at 80° C. to obtain a polymer powder (vinylidene fluoride copolymer (c2)). The polymer yield was 71%, and the inherent viscosity of the obtained polymer was 2.00 dl/g.

When the amount of each monomer unit in the obtained vinylidene fluoride copolymer (c2) was calculated by means of the $^{19}$F-NMR spectrum and the IR spectrum, the results were as follows. VDF: 96.52 mol %; HFP: 3.22 mol %; and MMM: 0.26 mol %.

The amount of each monomer unit in the vinylidene fluoride copolymer (c2) was calculated so that the total amount of VDF, HFP, and MMM was 100 mol % after the VDF/HFP ratio was calculated with the same method as in Working Example 1 and the VDF/MMM ratio was calculated using the method described below.

The VDF/MMM ratio in the vinylidene fluoride copolymer (c2) (the molar ratio of the amount of the constituent unit derived from vinylidene fluoride and the amount of the constituent unit derived from monomethyl maleate) was calculated on the basis of the indirect calculation method using an IR spectrum and a calibration curve disclosed in the pamphlet of WO/2009/084483.

The production conditions, physical properties, and composition of the vinylidene fluoride copolymer (c2) are shown in Table 1.

(Gel Electrolyte Production and Evaluation)

A gel electrolyte was obtained and evaluated in the same manner as in Working Example 1 with the exception that the vinylidene fluoride copolymer (1) was replaced with the vinylidene fluoride copolymer (c2).

The evaluation results of the gel electrolyte are shown in Table 2.

Comparative Example 3

In Comparative Example 3, a VDF-HFP copolymer SOLEF21216 manufactured by Solvay was used as a vinylidene fluoride copolymer (c3).

The inherent viscosity of the vinylidene fluoride copolymer (c3) was 1.73 dl/g.

When the amount of each monomer unit in the vinylidene fluoride copolymer (c3) was calculated from by means of the $^{19}$F-NMR spectrum, the results were as follows. VDF: 94.4 mol %; and HFP: 5.6 mol %.

The amount of each monomer unit in the vinylidene fluoride copolymer (c3) was calculated so that the total amount of VDF and HFP was 100 mol % after the VDF/HFP ratio was calculated using the same method as in Working Example 1.

The physical properties and composition of the vinylidene fluoride copolymer (c3) are shown in Table 1.

(Gel Electrolyte Production and Evaluation)

A gel electrolyte was obtained and evaluated in the same manner as in Working Example 1 with the exception that the vinylidene fluoride copolymer (1) was replaced with the vinylidene fluoride copolymer (c3).

The evaluation results of the gel electrolyte are shown in Table 2.

Figure 1:
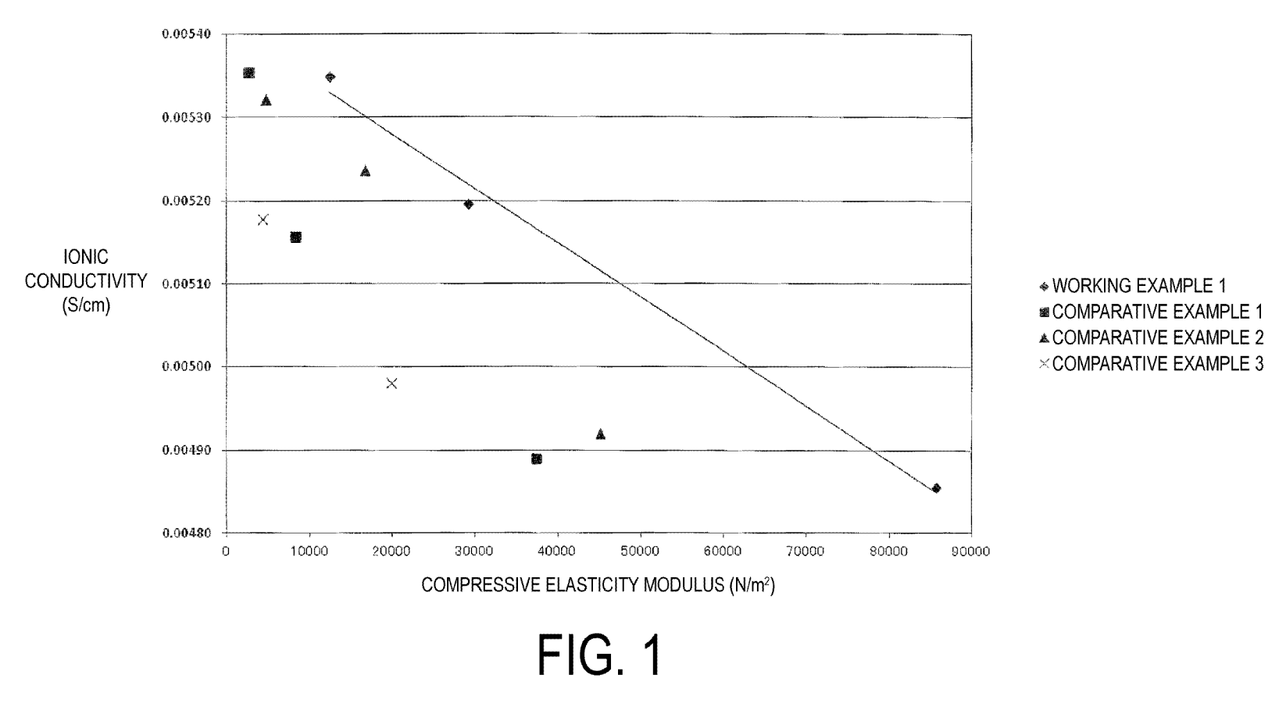
FIG. 1 illustrates the compressive elasticity modulus and ionic conductivity of the gel electrolytes obtained in Working Example 1 and the comparative examples.

The relationship between the compressive elasticity modulus and the ionic conductivity in each working example and comparative example is illustrated in FIG. 1. It can be seen from Table 2 and FIG. 1 that the gel electrolyte of the present invention has an excellent balance between the compressive elasticity modulus and ionic conductivity.

TABLE 1

| | | | Working Example 1 | Comparative Example 1 |
|---|---|---|---|---|
| | | Vinylidene fluoride polymer | (1) | (c1) |
| Charged amount for polymerization | | VDF/parts by mass | 90 | 90 |
| | | HFP/parts by mass | 10 | 10 |
| | | Comonomer type/parts by mass | AES/1.07 | AES/1.06 |
| | | Initially added amount/parts by mass | 0.11 | 1.06 |

TABLE 1-continued

|  |  |  |  |
|---|---|---|---|
|  | Subsequently added amount/parts by mass | 0.96 | — |
|  | Subsequently added comonomer-methanol solution concentration/[wt. %] | 50 | — |
|  | Water/parts by mass | 260 | 258 |
|  | 50 wt. % IPP Freon solution/parts by mass | 0.85 | 0.85 |
|  | SM-100/parts by mass | 0.14 | 0.15 |
| Polymerization conditions | Polymerization temperature/° C. | 29 | 26 |
|  | Comonomer subsequent addition rate/[g/min] | 0.1 | — |
|  | Initial pressure/MPa | 4.12 | 4.13 |
|  | Stopping pressure/MPa | 1.92 | 1.93 |
|  | Polymerization time/hr | 23 | 17 |
|  | Yield/% | 84 | 86 |
| Polymer physical properties | Inherent viscosity | 2.12 | 2.34 |
| Polymer composition | Mol conversion | | |
|  | VDF mol % | 96.73 | 97.06 |
|  | HFP mol % | 2.95 | 2.70 |
|  | Comonomer mol % | 0.32 | 0.24 |
|  | Total mol % | 100 | 100 |

II

|  |  | Comparative Example 2 | Comparative Example 3 |
|---|---|---|---|
|  | Vinylidene fluoride polymer | (c2) | (c3) |
| Charged amount for polymerization | VDF/parts by mass | 90 | Commercially available product |
|  | HFP/parts by mass | 10 |  |
|  | Comonomer type/parts by mass | MMM/0.5 |  |
|  | Initially added amount/parts by mass | 0.5 |  |
|  | Subsequently added amount/parts by mass | — |  |
|  | Subsequently added comonomer-methanol solution concentration/[wt. %] | — |  |
|  | Water/parts by mass | 259 |  |
|  | 50 wt. % IPP Freon solution/parts by mass | 0.84 |  |
|  | SM-100/parts by mass | 0.15 |  |
| Polymerization conditions | Polymerization temperature/° C. | 29 |  |
|  | Comonomer subsequent addition rate/[g/min] | — |  |
|  | Initial pressure/MPa | 4.1 |  |
|  | Stopping pressure/MPa | 1.91 |  |
|  | Polymerization time/hr | 33 |  |
|  | Yield/% | 71 |  |
| Polymer physical properties | Inherent viscosity | 2.00 | 1.73 |
| Polymer composition | Mol conversion | | |
|  | VDF mol % | 96.52 | 94.40 |
|  | HFP mol % | 3.22 | 5.60 |
|  | Comonomer mol % | 0.26 | — |
|  | Total mol % | 100 | 100 |

TABLE 2

I

| | Working Example 1 | | |
|---|---|---|---|
| Vinylidene fluoride polymer (polymer) | (1) | (1) | (1) |
| Polymer amount/parts by mass | 1 | 0.7 | 0.5 |
| Non-aqueous electrolyte solution/parts by mass | 9 | 9.3 | 9.5 |
| DMC/parts by mass | 9 | 9 | 9 |
| Compressive elasticity modulus/N m$^{-2}$ | $8.57 \times 10^4$ | $2.92 \times 10^4$ | $1.24 \times 10^4$ |
| Ionic conductivity/S cm$^{-1}$ | $4.86 \times 10^{-3}$ | $5.20 \times 10^{-3}$ | $5.35 \times 10^{-3}$ |

II

| | Comparative Example 1 | | |
|---|---|---|---|
| Vinylidene fluoride polymer (polymer) | (c1) | (c1) | (c1) |
| Polymer amount/parts by mass | 1 | 0.7 | 0.5 |
| Non-aqueous electrolyte solution/parts by mass | 9 | 9.3 | 9.5 |
| DMC/parts by mass | 9 | 9 | 9 |
| Compressive elasticity modulus/N m$^{-2}$ | $3.74 \times 10^4$ | $8.29 \times 10^3$ | $2.68 \times 10^3$ |
| Ionic conductivity/S cm$^{-1}$ | $4.89 \times 10^{-3}$ | $5.16 \times 10^{-3}$ | $5.35 \times 10^{-3}$ |

III

| | Comparative Example 2 | | |
|---|---|---|---|
| Vinylidene fluoride polymer (polymer) | (c2) | (c2) | (c2) |
| Polymer amount/parts by mass | 1 | 0.7 | 0.5 |
| Non-aqueous electrolyte solution/parts by mass | 9 | 9.3 | 9.5 |
| DMC/parts by mass | 9 | 9 | 9 |

TABLE 2-continued

| | | | |
|---|---|---|---|
| Compressive elasticity modulus/N m$^{-2}$ | 4.51 × 10$^4$ | 1.67 × 10$^4$ | 4.64 × 10$^3$ |
| Ionic conductivity/S cm$^{-1}$ | 4.92 × 10$^{-3}$ | 5.24 × 10$^{-3}$ | 5.32 × 10$^{-3}$ |

| IV |
|---|

| | Comparative Example 3 | | |
|---|---|---|---|
| Vinylidene fluoride polymer (polymer) | (c3) | (c3) | (c3) |
| Polymer amount/parts by mass | 1 | 0.7 | 0.5 |
| Non-aqueous electrolyte solution/parts by mass | 9 | 9.3 | 9.5 |
| DMC/parts by mass | 9 | 9 | 9 |
| Compressive elasticity modulus/N m$^{-2}$ | 1.99 × 10$^4$ | 4.33 × 10$^3$ | Measurement not possible |
| Ionic conductivity/S cm$^{-1}$ | 4.98 × 10$^{-3}$ | 5.18 × 10$^{-3}$ | 5.47 × 10$^{-3}$ |

Working Example 2

(Production of Vinylidene Fluoride Copolymer (2))

First, 1,040 g of ion-exchanged water, 0.56 g of Metolose SM-100, 3.40 g of a 50 wt. % di-i-propyl peroxy dicarbonate-1,1,2,2-tetrafluoroethyl-2,2,2-trifluoroethyl ether solution, 360 g of vinylidene fluoride, and 40 g of hexafluoropropylene (HFP) were charged into an autoclave with an internal volume of 2 liters and were heated to 29° C.

A total of 48 g of a 3 wt. % acrylic acid (AA) aqueous solution was then gradually added at a rate of 0.08 g/min while the temperature was maintained at 29° C. Polymerization was performed for a total of 22.5 hours from the start of heating.

After polymerization was ended, the polymer slurry was heat-treated for 60 minutes at 95° C. The polymer slurry was then dehydrated, washed with water, and dried again for 20 minutes at 80° C. to obtain a polymer powder (vinylidene fluoride copolymer (2)).

The polymer yield was 83%, and the inherent viscosity of the obtained polymer was 2.20 dl/g.

When the amount of each monomer unit in the obtained vinylidene fluoride copolymer (2) was calculated from various NMR spectra and IR spectra, the results were as follows. VDF: 96.51 mol %; HFP: 3.10 mol %; and AA: 0.39 mol %. The VDF/HFP ratio was calculated with the same method as that described in Working Example 1, and the AA concentration in the vinylidene fluoride copolymer (2) was determined with a conventionally known method. The amount of each monomer unit was calculated from the two values above.

The production conditions, physical properties, and composition of the vinylidene fluoride copolymer (2) are shown in Table 3.

(Gel Electrolyte Production and Evaluation)

A gel electrolyte was obtained and evaluated in the same manner as in Working Example 1 with the exception that the vinylidene fluoride copolymer (1) was replaced with the vinylidene fluoride copolymer (2).

The evaluation results of the gel electrolyte are shown in Table 4.

Figure 2:
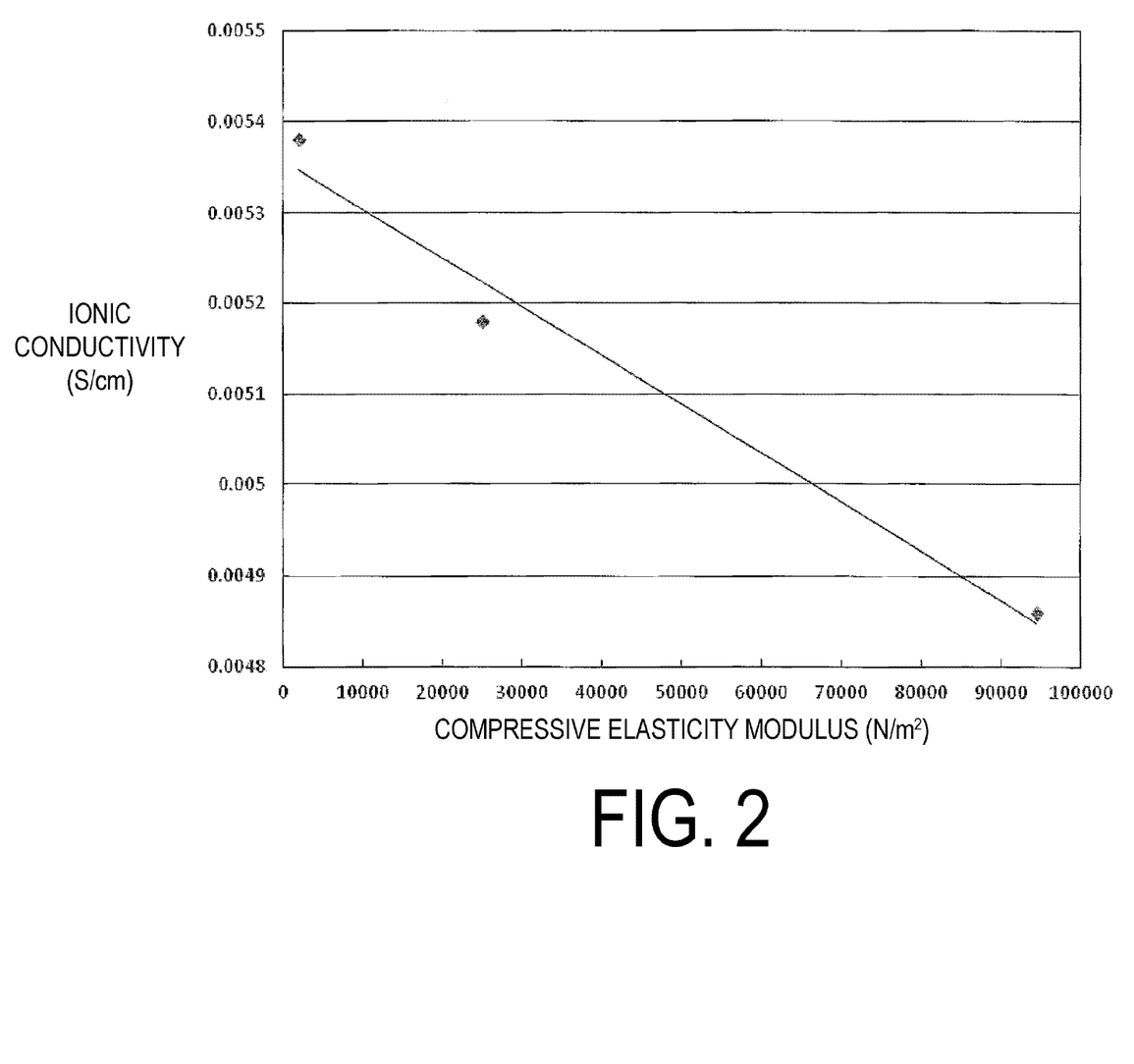
FIG. 2 illustrates the compressive elasticity modulus and ionic conductivity of the gel electrolyte obtained in Working Example 2.

The relationship between the compressive elasticity modulus and the ionic conductivity in Working Example 2 is illustrated in FIG. 2.

TABLE 3

| | | Working Example 2 |
|---|---|---|
| Charged amount for polymerization | Vinylidene fluoride polymer | (2) |
| | VDF/parts by mass | 90 |
| | HFP/parts by mass | 10 |
| | Comonomer type/parts by mass | AA/0.36 |
| | Initially added amount/parts by mass | 0 |
| | Subsequently added amount/parts by mass | 0.36 |
| | Subsequently added comonomer-aqueous solution concentration/[wt. %] | 3 |
| | Water/parts by mass | 260 |
| | 50 wt. % IPP solution/parts by mass | 0.85 |
| | SM-100/parts by mass | 0.14 |
| Polymerization conditions | Polymerization temperature/° C. | 29 |
| | Comonomer subsequent addition rate/[g/min] | 0.08 |
| | Initial pressure/MPa | 4.09 |
| | Stopping pressure/MPa | 1.85 |
| | Polymerization time/hr | 22.5 |
| | Yield/% | 83 |
| Polymer physical properties | Inherent viscosity | 2.2 |
| Polymer composition | Mol conversion | |
| | VDF mol % | 96.51 |
| | HFP mol % | 3.1 |
| | Comonomer mol % | 0.39 |
| | Total mol % | 100 |

TABLE 4

| | Working Example 2 | | |
|---|---|---|---|
| Vinylidene fluoride polymer (polymer) | (2) | (2) | (2) |
| Polymer concentration: wt. % | 10 | 7 | 5 |
| Polymer amount/parts by mass | 1 | 0.7 | 0.5 |
| Non-aqueous electrolyte solution/parts by mass | 9 | 9.3 | 9.5 |
| DMC/parts by mass | 9 | 9 | 9 |
| Compressive elasticity modulus/N m$^{-2}$ | 1.97 × 10$^3$ | 2.50 × 10$^4$ | 9.45 × 10$^4$ |
| Ionic conductivity/S cm$^{-1}$ | 5.38 × 10$^{-3}$ | 5.18 × 10$^{-3}$ | 4.86 × 10$^{-3}$ |

The invention claimed is:

1. A gel electrolyte, containing a vinylidene fluoride copolymer and a non-aqueous electrolyte solution, wherein the vinylidene fluoride copolymer is obtained by copolymerizing at least one type of fluorine-based monomer selected from hexafluoropropylene and chlorotrifluoroethylene, vinylidene fluoride, and a compound represented by chemical formula (1),

[Chemical Formula (1)]

(1)

wherein in chemical formula (1), R1, R2, and R3 are each independently a hydrogen atom, a chlorine atom, or an alkyl group having from 1 to 5 carbons; and X is a hydroxyl group or an atomic group having a carboxyl group and having a molecular weight of not greater than 517 with a main chain having from 1 to 19 atoms; and wherein the gel electrolyte has an ionic conductivity of at least $4.86 \times 10^{-3}$ Scm$^{-1}$ and a compressive elasticity modulus of $8.57 \times 10^4$ Nm$^{-2}$ or greater.

2. The gel electrolyte according to claim 1 containing the non-aqueous electrolyte solution in an amount of from 90 to 99 wt. % per 100 wt. % of the gel electrolyte.

3. A non-aqueous battery having the gel electrolyte according to claim 1.

4. A production method for a forming a gel electrolyte, comprising copolymerizing at least one type of fluorine-based monomer selected from hexafluoropropylene and chlorotrifluoroethylene, vinylidene fluoride, and a compound represented by chemical formula (1) to form a vinylidene fluoride copolymer comprising, wherein the compound represented by formula (1) is added to the fluorine-based monomer and vinylidene fluoride in divided portions or continuously during copolymerization;

[Chemical Formula 4(1)]

(1)

wherein, in chemical formula (1), $R^1$, $R^2$, and $R^3$ are each independently a hydrogen atom, a chlorine atom, or an alkyl group having from 1 to 5 carbons; and X is a hydroxyl group or an atomic group having a carboxyl group and having a molecular weight of not greater than 517 with a main chain having from 1 to 19 atoms; and wherein the gel electrolyte contains the vinylidene fluoride copolymer and a non-aqueous electrolyte solution and has an ionic conductivity of at least $4.86 \times 10^{-3}$ Scm$^{-1}$ and a compressive elasticity modulus of $8.57 \times 10^4$ Nm$^{-2}$ or greater.

5. The gel electrolyte according to claim 1, wherein the compound represented by formula (1) is a compound represented by chemical formula (2),

[Chemical Formula (2)]

(2)

wherein, in formula (2), R1, R2, and R3 are the same as in chemical formula (1); and X' is an atomic group having a molecular weight of not greater than 472 with a main chain having 6 from 1 to 19 atoms.

6. The gel electrolyte according to claim 5, wherein the compound represented by chemical formula (2) is a compound represented by chemical formula (3),

[Chemical Formula (3)]

(3)

wherein, in chemical formula (3), R1, R2, and R3 are the same as in chemical formula (1); and X" is an atomic group having a molecular weight of not greater than 456 with a main chain having from 1 to 18 atoms.

* * * * *